United States Patent [19]
Hoyt et al.

[11] Patent Number: 4,963,166
[45] Date of Patent: Oct. 16, 1990

[54] VAPOR PURIFICATION APPARATUS

[76] Inventors: Douglas C. Hoyt, P.O. Box 173, Suwanee, Ga. 30174; William M. Callum, 5950 Riverwood Dr., Atlanta, Ga. 30328

[21] Appl. No.: 459,541

[22] Filed: Jan. 2, 1990

[51] Int. Cl.$^5$ .............................................. B01D 50/00
[52] U.S. Cl. ........................................ 55/316; 55/387; 55/479
[58] Field of Search ......................... 55/316, 387, 479; 422/169, 170

[56] References Cited

U.S. PATENT DOCUMENTS

| 890,704 | 6/1908 | Peterson | 55/387 |
|---|---|---|---|
| 3,864,106 | 2/1975 | Brandt | 55/473 |
| 4,162,289 | 7/1979 | Gomez et al. | 55/316 |

FOREIGN PATENT DOCUMENTS

| 15118 | 1/1989 | Japan | 55/387 |
|---|---|---|---|
| 581978 | 12/1977 | U.S.S.R. | 55/387 |

Primary Examiner—Bernard Nozick
Attorney, Agent, or Firm—Moore & Hansen

[57] ABSTRACT

Apparatus for removing contaminants from vapor utilizing a vertical flow passage through an adsorption bed vertically arranged in an upright housing. The adsorption bed may comprise several layers of gas-adsorbing media particularly suitable for removing corrosive gases such as hydrogen sulfide from air to be maintained at a desired contaminant-free level in a controlled environment. A perforated, conical member positioned in the lower end of the housing serves to support the media bed as well as to evenly distribute contaminated air, pressurized by a blower, upwardly through the media bed.

A head section carrying a discharge segment having a purified vapor outlet is rotatably mounted on top of the housing. Rotary adjustment of the head section permits the purified air or other vapor to be discharged in a desired direction at a predetermined location.

15 Claims, 2 Drawing Sheets

VAPOR PURIFICATION APPARATUS

BACKGROUND OF THE INVENTION

This invention relates to apparatus for removing impurities from vapors, and in particular to such apparatus for removing gaseous contaminants from air. There are many applications, such as clean rooms used in manufacturing and packaging processes and equipment operating rooms, where the environment must be closely controlled. Corrosive gases such as hydrogen sulfide are especially intolerable in many such applications.

Apparatus for purifying vapor by means of adsorption of gaseous contaminants is well known. Mechanical filters for removing airborne foreign particles are also in widespread use. Various types of particulate media, including activated carbon and activated alumina have been used for selective adsorption of corrosive and noxious gases. However, there is a need in industrial and commercial applications for a vapor purification unit which can effectively and economically maintain the air in a controlled space at a desired level of purification, substantially free of harmful gaseous contaminants, while discharging the purified air in the desired direction and location within the space in which environmental control is critical. In continuously operating air purification systems, it is essential that this be done with no significant decrease in air purification levels and without having to replace or regenerate the adsorption media at unduly short time intervals.

The vapor purification apparatus disclosed herein has been designed and manufactured with a view towards meeting such needs.

BRIEF SUMMARY OF THE INVENTION

The vapor purification apparatus of this invention has as its primary objective the ability to establish and maintain a high level of gaseous purity in a controlled space while maintaining positive pressure in the space to prevent the in-leakage of corrosive or contaminated air.

It is a further object to fully utilize adsorption media so as to minimize the frequency of media replacement.

Another object is to permit the discharge of purified air in a desired direction at a location most suitable for the particular application.

Still a further object is to provide a spent media clean-out and replacement system which will hold down time of the apparatus to a minimum.

These objects and advantages are achieved in a vapor purification unit particularly characterized by a vertically-oriented housing containing gas adsorption media beds vertically positioned and arranged in a vertical vapor flow passage in such a way between a lower level vapor inlet and a vapor outlet at the top of the unit that full utilization of the media is achieved and no bypassing of the media beds by corrosive vapors occurs. A vapor pressurizing blower is positioned at the vapor inlet and delivers a pressurized vapor stream upwardly through the media beds and out into the controlled space through the upper level vapor outlet.

As a particularly advantageous feature, a combined media support and vapor-distributing device in the form of a perforated metal cone is positioned in the lower end of the vertical housing adjacent to the vapor inlet. The metal cone supports the media beds above it and also functions as a diffuser to evenly distribute the incoming, contaminated vapors upwardly over the entire area of the adsorption beds.

A further beneficial feature resides in the provision of a head section rotatably mounted on the upper end of the vertical housing and carrying a discharge segment having the vapor outlet on its free end. The discharge segment is angularly disposed with respect to the vertically extending housing; and by rotatably adjusting the head section on the housing, the discharge segment may be angularly positioned to direct purified vapors in a predetermined direction at a desired location through the vapor outlet.

A media fill port in the top of the aforesaid head section and a media clean-out port in the lower end of the vertical housing permit particularly rapid loading and unloading of media to and from the housing without the use of any special tools. Flow passages are connected between the bottom of the aforesaid media support cone and the clean-out port in such a way that the operation of a vacuum pump connected to the clean-out port creates a venturi effect at the bottom end of the support cone. This serves to induce a rapid outflow of spent media through the support cone and out the clean-out port.

These and other objects and advantages of the invention will be readily understood as the following description is read in conjunction with the accompanying drawings wherein like reference numerals have been used to identify like elements throughout the several views.

DESCRIPTION OF THE PREFERRED EMBODIMENT

Figure 2:
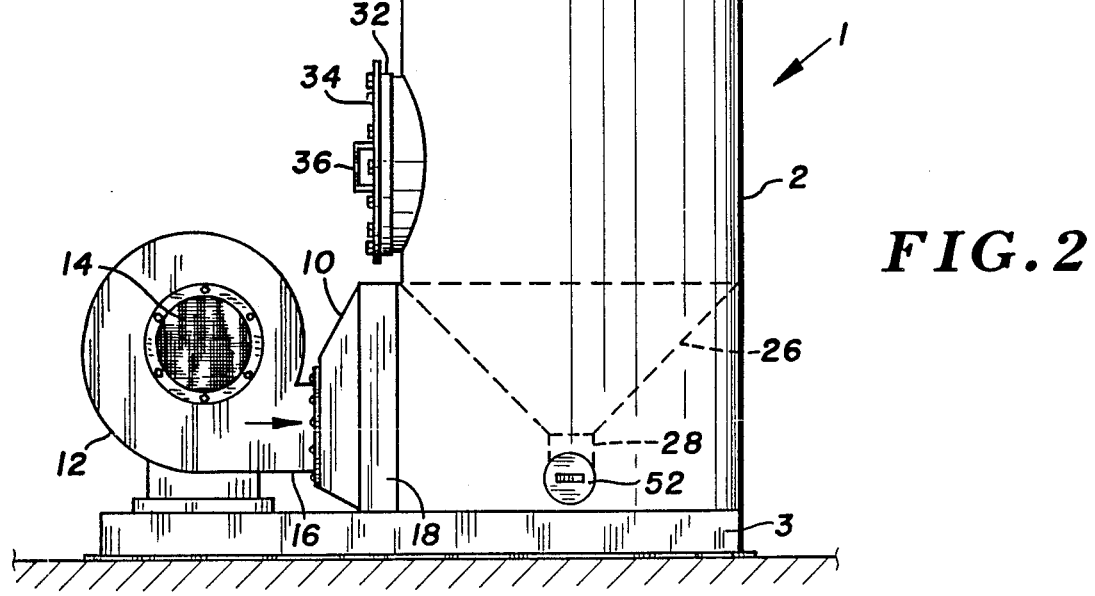
FIG. 2 is a side elevation view of the vapor purification apparatus of this invention.
Figures 3, 4, 5:
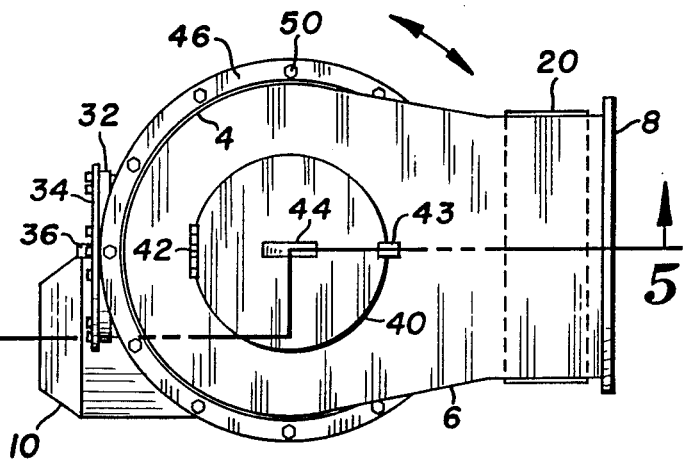
FIG. 3 is a top plan view of the apparatus of FIG. 2.
FIG. 4 is an end view of the apparatus of FIG. 2 with the infeed blower removed.
FIG. 5 is a vertical section view of the apparatus taken along lines 5—5 of FIG. 3.

With reference to the drawings, the vapor purification apparatus is shown in FIGS. 2-5, and comprises an upright, vertically-extending housing 1 mounted on a base pedestal 3. Housing 1 is comprised of a vapor purification section 2 which contains media for removing gaseous impurities as hereinafter described, and an upper head section 4. As is indicated in FIG. 5, the upper head section housing 4 defines a chamber 5 into which purified air is directed after passing through the media beds. Connected to head section 4 and constructed integrally therewith is a discharge segment 6 having a purified vapor outlet 8. As may be noted with respect to the top view of FIG. 3, housing 1 is preferably a right circular cylinder having a generally vertical, longitudinal axis. In the preferred embodiment, discharge segment 6 is oriented generally horizontally and thus extends in a direction substantially perpendicular to the vertical axis of housing 1.

A vapor inlet 10 is located on the side of housing 1, at the lower end thereof to receive pressurized, contaminated vapors from an input fan or blower 12. Blower 12 is preferably of the centrifugal type and has a screened inlet port 14 for receiving contaminated vapors. The pressurized, contaminated vapor stream is directed from blower 12 through a discharge passage 16 into vapor inlet 10 of housing 1.

For the purpose of removing airborne dust and debris, a first, prefilter 18, and a second, final filter 20 are utilized Both of these filters are of the mechanical type as utilized in heating and air-conditioning applications, and contain a filtering element, such as fiberglass. Prefilter 18 is positioned generally vertically in the horizontal air stream passing through vapor inlet 10 into the lower end of housing 1. Thirty to thirty-five percent of the airborne particulate impurities are removed by prefilter 18. Ultimately, through the action of final filter 20, ninety to ninety-five percent of the airborne dust and particulate contaminants are removed. Final filter 20 is also preferably oriented vertically as shown in the drawings, upstream of pure vapor outlet 8 in discharge segment 6. Thus, final filter 20 is positioned in the discharging vapor stream for final filtration, after the vapors have passed through the gaseous impurity-adsorbing media contained within the vapor-purifying section 2 of housing 1.

The aforesaid gaseous impurity-adsorbing media comprise a media bed arranged vertically within housing 1 for passage of contaminated vapors therethrough in a substantially upward, vertical direction. Various types and arrangements of vapor-adsorbing media may be utilized. Preferably, the vapor-adsorbing media comprises multiple layers or beds of particulate media 22 and 24 arranged one on top of the other as shown in FIG. 5. The first particulate bed or layer 22 may comprise activated carbon with a high internal surface area for very effective vapor phase adsorption of gaseous impurities such as carbon tetrachloride and hydrocarbons. The second, upper media bed 24 preferably comprises activated alumina impregnated with potassium permanganate. This bed of particular material is formulated to be especially effective in adsorbing hydrogen sulfide and suphur dioxide as gaseous impurities. Each of the vapor-adsorption layers 22 and 24 are preferably on the order of 12 inches in height, with the total adsorption bed being two to three feet in vertical extent.

In order to properly support the media beds, as well as to evenly distribute the contaminated vapor stream upwardly through the media beds, a combined media support and air-diffusing member 26 is provided in the lower end of housing 1. Member 26 is of generally conical shape, as shown, and has upwardly and outwardly-extending side walls which are perforated to provide a plurality of vapor-inlet apertures 27, as shown most clearly in FIG. 5. Conical member 26 may be made of various materials, perforated stainless steel having been found to be particularly desirable for use in the corrosive atmospheres anticipated. As may be noted with respect to FIG. 5, conical member 26 is positioned in the lower end of vertical housing 1 so as to interrupt the generally horizontal flow of pressurized, contaminated vapors entering that portion of housing 1 from blower 12 through inlet 10. As is indicated by the flow arrows in FIG. 5, the incoming, contaminated vapors are forced to turn upwardly and to pass through the perforations 27 in the side walls of conical member 26. As a result, the contaminated vapors are distributed evenly across the entire horizontal cross section of vertically arranged media beds 22 and 24. Because of the vertical arrangement of the media beds, and the vertical flow of contaminated vapors therethrough, the possibility of contaminated vapors bypassing any portion of the media bed is eliminated. Such bypassing can occur if filtration or adsorbing media are arranged in a horizontal flow passage. With such an arrangement, settling of the media over a period of time can result in bypassing of portions of the media bed.

The particulate media material comprising the media bed or layers is supported on the upwardly-inclined, perforated side walls of conical member 26. The bottom end of conical member 26 opens downwardly into a short, vertically-extending connector passage 28, which in turn forms a T-connection with a generally horizontally extending, transverse flow conduit 30. Flow conduit 30 may be a metal pipe duct having T-connector 28 secured thereto intermediate its opposite ends as shown most clearly in FIG. 4. Transverse flow passage 30 communicates at one end thereof, on the front side of the unit with a media clean-out port 31, and at its opposite end, on the rear side of the housing 1, with an air intake port 54, utilized in combination with clean-out port 31 to remove spent media from housing 1, as hereinafter set forth. Clean-out port 31 is normally closed by a removable plug or door 52 (FIG. 2); and a similar, removable closure plug or door (not shown) is provided over air intake port 54.

It is to be noted that the upper or conical base end 29 of conical support and diffuser member 26 is of circular configuration in a horizontal plane, and conforms to and abuts against the interior, circular wall surface of vapor purification section 2 of housing 1. Thus, the contaminating gas adsorption layers 22 and 24 are also of circular shape, in horizontal cross section as viewed in FIG. 5.

A media inspection port 32 is provided on one side wall of vapor purification section 2 of housing 1, and is normally closed by a removable cover plate or door 34, having a handle 36. Inspection door cover 34 may be bolted in place, such bolts being indicated in FIG. 4.

At the upper end of the vapor purification apparatus, and preferably on top of head section 4, a media fill port 38 is provided. Fill port 38 is normally closed by a closure member or lid 40, held in tight, sealing contact therewith by means of a latch 43. Lid 40 is provided with hinges 42, whereby it may be swung to the open position shown in FIG. 2, by manually releasing latch 43. The opening and closing of fill port lid 40 is facilitated by handle 44. As is shown in FIG. 2, a gasket 45 is secured to the underside of lid 40 in order to maintain tight, sealing contact with the upper periphery of media fill port 38, when the lid is closed.

As a particularly advantageous feature of the apparatus, upper head section 4 is rotatably mounted on top of vapor purification section 2 of upright housing 1. For this purpose, head section 4 has a circular flange 46 around its bottom periphery, which mates with a circular flange 48 on the top of housing section 2. A gasket 47 is interposed between the two flanges in order to maintain a tight seal on the housing. Each of the flanges 46 and 48 has a plurality of apertures therethrough to receive removable fasteners 50. Fasteners 50 preferably comprise threaded bolts having nuts on their bottom ends. Thus, when the apparatus is initially installed at a vapor purification site, head 4 is rotatably adjusted on top of vapor purification section 2 of housing 1 in order to orient discharge segmet 6 in the desired direction. This will ensure that purified vapor will be discharged into the controlled space at the desired location through vapor outlet 8, and in the desired direction. After the rotatable adjustment of head 4 on housing section 2, the apertures in mating flanges 46 and 48 are aligned, and fasteners 50 are secured in place through the two flanges. As noted above, discharge segment 6 preferably extends horizontally generally at right angles to the vertical direction of extent of housing 1. Discharge section 6 may thus be adjustably positioned in a horizontal plane through a full 360° arc, on top of housing section 2, so as to position vapor outlet 8 at the desired location for horizontal discharge of a purified vapor stream into the controlled space.

Figure 1:
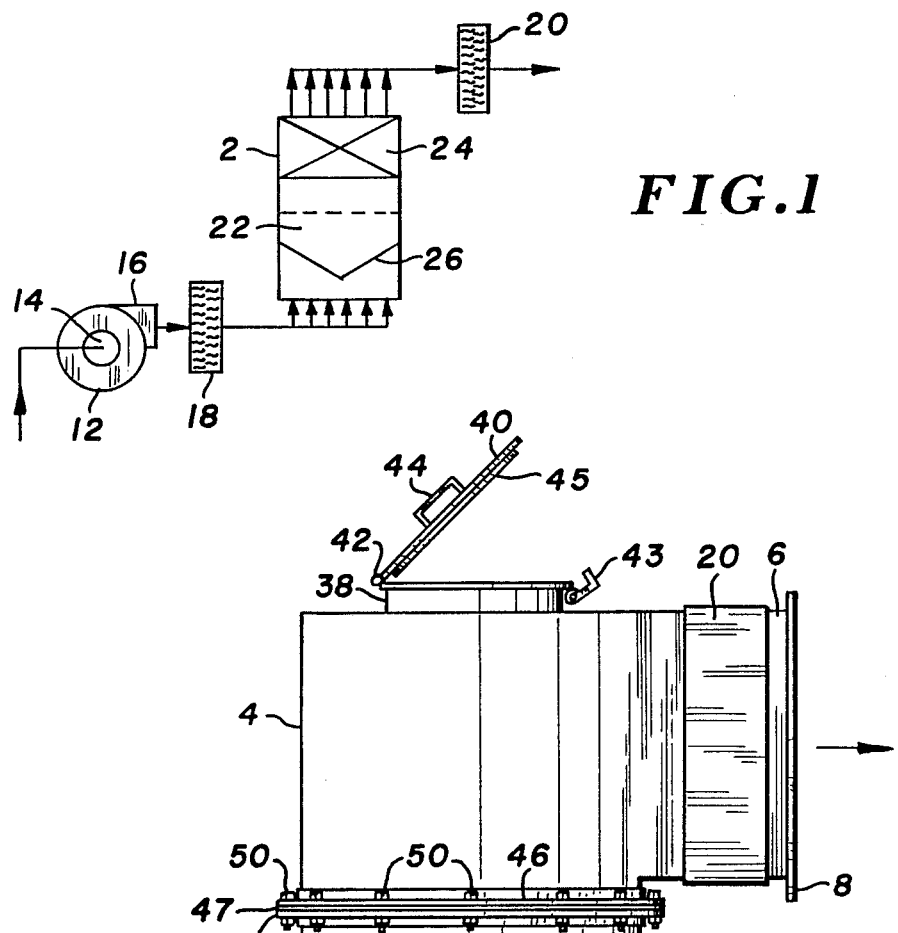
FIG. 1 is a schematic showing of the vapor purification system and steps utilizing the improved apparatus disclosed herein.

The vapor purification apparatus disclosed herein may be used for removing contaminating and undesirable gases from various vapors in different types of applications. It is anticipated that the primary application will be in removing corrosive vapors, such as hydrogen sulfide and carbontetrachloride from air in the environment of spaces wherein the atmosphere must be closely controlled, such as in equipment and machine rooms. The vertically-oriented housing and media bed arrangement disclosed herein is particularly effective for such applications Contaminated air is drawn into centrifugal blower 12 through its air inlet screen 14 and discharged under pressure through vapor inlet 10, into the lower end of vertically-oriented housing 1. The upwardly, outwardly diverging walls of conical diffuser and media-support member 26 deflect the air and direct it upwardly through perforations 27 in the conical member. The evenly distributed air stream flows upwardly through the entire cross-sectional area of the media bed layers 22 and 24. As noted above, the vertical arrangement of the media beds with a vertical, upwardly flowing air stream eliminates the possibility of corrosive vapors bypassing any of the media, as the media settles. Airborne dust and debris are initially removed from the air stream in prefilter 18. As the corrosive gases pass through the adsorption vessel purification section 2, corrosive and contaminating gases are removed. Continuing operation ensures that the air in the controlled environment will be maintained at predetermined, low levels of gaseous impurities. Purified air or other vapors, discharged through vapor outlet 8 at the desired location and in the predetermined direction by adjusting rotary head 4, may be further conditioned as to temperature and humidity, as required, by introducing it to the central air-conditioning system of the controlled environment. Each of the aforesaid steps of vapor purification including the prefiltration step, gaseous impurity adsorbing step, and final filtration step, are illustrated schematically in the diagram of FIG. 1.

The condition of media beds 22 and 24 may be monitored through inspection port 32 and through top, fill port 38. The media must be replaced from time to time, after it becomes saturated with contaminating gases which have been adsorbed on the particulate media material. Media removal and replacement is greatly facilitated by the combination of top fill port 38 and lower, media clean-out port 31. The system is first shut off, and then the fill plug or lid 40 covering media fill port 38 is opened. Thereafter, the closure plug or cover member 52 for media clean-out port 31 is removed; and air intake port 54 in the opposite end of transverse duct passage 30 is also opened by removing its cover plug. A flexible hose connected to a vacuum pump is then connected to clean-out port 31. The vacuum pump is then operated to remove the spent media from purification section 2 of cylindrical housing 1. The operation of the vacuum pump will cause the flow of air from port 54 transversely through conduit passage 30, and out clean-out port 31. Such transverse air flow through passage 30 will create a venturi effect through vertical T-connector passage 28 at the bottom of conical member 26. This will have the effect of drawing spent media downwardly from the two media beds 22 and 24 and out the bottom of conical member 26 into transverse flow passage 30. The vacuum pump will thus draw the spent media outwardly through clean-out port 31.

After the spent media is removed, a new charge of media may be loaded into the vapor purification section 2, on top of conical support member 26, through fill port 38. The prefilter 18 and final filter 20 may of course be replaced as needed, as those filters become loaded with airborne dust particles and other particulate material.

It is anticipated that various changes may be made in the size, construction, and arrangement of the components of the vapor purification apparatus disclosed herein without departing from the spirit and scope of the invention as defined by the following claims.

What is claimed is:

1. Apparatus for removing impurities from contaminated vapor comprising:
a vertically oriented housing containing gas adsorption media for removing gaseous contaminants in a vapor stream;
a vapor inlet near the lower end of said housing;
vapor pressurization means positioned adjacent to said inlet for directing a pressurized stream of vapor through said inlet and into the lower end of said housing and thence upwardly through said media;
a combined media-support and vapor-diffusing member positioned in the lower end of said housing adjacent to said vapor inlet, said member being of conical shape and having perforated walls which incline upwardly and outwardly from its bottom, whereby said media is supported on said perforated walls of said conical member and pressurized vapor entering the lower end of said housing is evenly distributed upwardly through said perforated walls and thence vertically upwardly through said media; and
a head section on the upper end of said housing for receiving purified vapors from the upper end of said media, said head section carrying a discharge segment having a vapor outlet through which purified vapors may be discharged, said discharge segment being angularly disposed with respect to the vertical axis of said housing, and said head section being rotatably mounted on top of said housing for rotatably adjustable positioning thereon, whereby said discharge segment and said vapor outlet may be rotatably, adjustably positioned to direct purified vapors in a predetermined direction at a desired location through said vapor outlet from the upper end of said housing.

2. Apparatus as defined in claim 1 wherein:
said discharge segment is oriented generally horizontally and is rotatably positionable with said head section within a 360° arc in a horizontal plane so as to position said vapor outlet at a predetermined location for horizontal discharge of a purified vapor stream in a direction generally perpendicular to the vertical axis of said housing.

3. Apparatus as defined in claim 1 wherein:
said media comprises a plurality of beds of particulate, gaseous contaminant-adsorping material vertically positioned in multiple layers within said housing on top of said conical member between said conical member and said head section.

4. Apparatus as defined in claim 1 and further including:
   means for supporting said head section relative to said housing for rotatable adjustment thereon.

5. Apparatus as defined in claim 4 wherein:
   said supporting means comprises an arcuate flange on said head section and a mating flange on the upper end of said housing on which said head section is rotatably supported, each of said flanges having a plurality of apertures therein through which removable fasteners may be received and secured, whereby said head section may be rotated on said housing to orient said discharge segment in the desired position for purified vapor discharge, and to align said apertures in the mating flanges to receive said fasteners 6. Apparatus for removing impurities from contaminated vapor comprising:
   a vertically oriented housing containing gas adsorption media in a bed vertically arranged within said housing for removing gaseous contaminants in a vapor stream;
   a vapor inlet near the lower end of said housing;
   vapor pressurization means positioned adjacent to said inlet for directing a pressurized stream of vapor through said inlet and into the lower end of said housing, and thence upwardly through said media bed;
   a head section on the upper end of said housing for receiving purified vapors from the upper end of said media bed, said head section carrying a discharge segment having a vapor outlet through which purified vapors may be discharged; and
   a combined media support and vapor-diffusing member positioned in the lower end of said housing adjacent to said vapor inlet, said member being of conical shape and having perforated walls which incline upwardly and outwardly from its bottom, whereby said media bed is supported on said perforated walls of said conical member and pressurized vapor entering the lower end of said housing is evenly distributed upwardly through said perforated walls and thence vertically upwardly through said media bed.

7. Apparatus as defined in claim 6 wherein:
   a first mechanical filter for removing dust and other airborne particulate impurities is positioned adjacent to said vapor inlet for passage of incoming, contaminated vapors therethrough; and
   a second, final mechanical filter is positioned on said discharge segment, upstream of said vapor outlet, for further removal of contaminants after vapors have passed through said media bed and prior to the discharge of purified vapors through said vapor outlet.

8. Apparatus as defined in claim 6 wherein:
   said media bed comprises a plurality of layers of particulate material for adsorbing gaseous contaminants, said layers being vertically arranged on top of each other and supported on said conical member within said vertical housing.

9. Apparatus as defined in claim 8 wherein:
   a first layer of said particulate media material directly supported on said conical member comprises activated carbon, and a second layer of media on top of said first layer comprises potassium permanganate and activated alumina.

10. Apparatus as defined in claim 6, and further including:
    a media fill port on top of said head section and having a closure member in sealing, normally closed covering relation thereto, said closure member being movable from a normally closed position to an open position without the use of any tools, to permit gas adsorption media to be introduced into said housing on top of said conical member.

11. Apparatus as defined in claim 10, and further including:
    a spent media clean-out port in the lower end of said housing in fluid flow communication with the bottom of said conical member, whereby spent media may be removed from the bottom of said conical member through said clean-out port.

12. Apparatus as defined in claim 6, and further including:
    a spent media clean-out port in the lower end of said housing;
    an air intake port in the lower end of said housing, opposite said clean-out port; and
    a transverse flow passage in the lower end of said housing connected between said clean-out port and said air intake port, said transverse passage being connected intermediate its ends with the bottom of said conical member in fluid flow communication therewith, whereby the inducement of air flow through said transverse passage will provide a venturi effect at the bottom of said conical member and thus draw spent media downwardly through the bottom of said conical member and outwardly through said clean-out port.

13. Apparatus as defined in claim 12 wherein:
    said transverse passage is located below said conical member and is connected to the bottom of said conical member at a location along the length of said transverse passage intermediate said clean-out port and said air-intake port.

14. Apparatus for removing impurities from contaminated vapor comprising:
    a vertically oriented housing containing gas adsorption media for removing gaseous contaminants in a vapor stream;
    a vapor inlet near the lower end of said housing;
    vapor pressurization means positioned adjacent to said inlet for directing a pressurized stream of vapor through said inlet and into the lower end of said housing and thence upwardly through said media;
    a head section on the upper end of said housing for receiving purified vapors from the upper end of said media, said head section carrying a discharge segment having a vapor outlet through which purified vapors may be discharged, said discharge segment being angularly disposed with respect to the vertical axis of said housing, and said head section being rotatably mounted on top of said housing for rotatably adjustable positioning thereon, whereby said discharge segment and said vapor outlet may be rotatably, adjustably positioned to direct purified vapors in a predetermined direction at a desired location through said vapor outlet from the upper end of said housing; and
    a media-fill port on top of said head section and having a closure member in sealing, normally-closed covering relation thereto, said closure member being movable from a normally closed position to an open position to permit gas adsorption media to be introduced into said housing.

15. Apparatus as defined in claim 14 and further including:
a spent media clean-out port in the lower end of said housing in fluid flow communication with the bottom of said conical member, whereby spent media may be removed from the bottom of said conical member through said clean-out port.

* * * * *